United States Patent [19]
Glasband

[11] Patent Number: 5,969,510
[45] Date of Patent: Oct. 19, 1999

[54] THREE-PHASE TO SIX-PHASE WYE TRANSFORMER POWER SYSTEM

[75] Inventor: Martin S. Glasband, Selma, Oreg.

[73] Assignee: Equi-Tech Corporation, Selma, Oreg.

[21] Appl. No.: 08/935,614

[22] Filed: Sep. 23, 1997

[51] Int. Cl.[6] ........................................... G05F 1/00
[52] U.S. Cl. .............................. 323/215; 363/36
[58] Field of Search ..................... 363/36, 34, 39; 336/12; 323/255, 215

[56] References Cited

U.S. PATENT DOCUMENTS 5,003,277  3/1991  Sokai et al. ............................. 336/10
5,640,314  6/1997  Glasband et al. ......................... 363/36

*Primary Examiner*—Shawn Riley
*Attorney, Agent, or Firm*—Robert R. Thornton

[57] ABSTRACT

The present invention discloses a method for providing balanced power to a single-phase ac load from a three-phase ac power source. The method includes imposing an isolation power transformer between the ac power source and the load wherein the isolation transformer has a three-phase primary winding and a six-phase "wye" connected secondary winding, at least one of the three legs of the secondary having a center tap and being connected to the load such that the center tap provides a reference potential for the load and the reactive load currents are equal and inversely-phased with respect to the reference potential.

18 Claims, 2 Drawing Sheets

THREE-PHASE TO SIX-PHASE WYE TRANSFORMER POWER SYSTEM

BACKGROUND OF THE PRIOR ART

Three-phase power has been the primary method of power distribution for many years. However, for many uses, such as incandescent lights, most home appliances, and various types of other electrical and electronic equipment, which present a single-phase load to the power source, it is necessary to acquire single phase power from the three-phase power being supplied in order to operate.

As the typical single-phase load requires a single-phase power source with which to operate, customarily a single-phase power transformer is connected across one of the three outputs of the three-phase power source to convert three-phase power into single-phase power for the purpose of operating the single-phase load. However, this configuration often results in excessive current distortion in the three-phase power source.

Another method for accomplishing this objective is to use three separate conventional single-phase transformers that are connected to the three-phase source. This method allows for a more evenly balanced current load and is less likely to cause current distortion than the use of only one single-phase transformer.

Three-phase "wye" transformers are also being used as a means of distributing single-phase power from a three-phase source. This is accomplished by interposing a delta-to-wye three-phase transformer between the three-phase source and the single-phase load. This method also provides for a more evenly divided current load and is less likely to cause current distortion than simply connecting one single-phase power transformer across two of the three phases of the power source.

These methods, however, may result in major problems in power quality which will adversely affect sophisticated electronic equipment, particularly such equipment in current use which constitutes a non-linear type load. Switching power supplies often found in digital electronic loads and fluorescent lighting are two examples of this non-linear loading. Among the problems non-linear loading creates are: excessive reactive currents, excessive EMI/RFI emissions, poor power factor, harmonic distortion and nuisance grounding currents.

Interposing a single-phase transformer having a secondary winding with a center tap thereon which is used for grounding purposes only to provide a balanced single-phase voltage source (e.g. 120/60V), as is shown in U.S. Pat. No. 5,640,314, creates an unbalanced current load on the three-phase source and the use of three such transformers is very cumbersome and expensive.

SUMMARY OF THE PRESENT INVENTION

I have found that the solution to these problems is to balance the voltage with respect to ground across the single-phase circuits so as to provide for the nulling or phase cancellation of the reactive currents and other nuisance power-related artifacts by interposing a three-phase to six-phase "wye" transformer between the three-phase power source and the single-phase loads.

In the practice of this invention, a novel three-phase to six-phase "wye" power transformer is utilized to enable balanced single-phase AC power (e.g. 120/60V; 222/138.5V, etc.) to be derived from a three-phase AC power distribution system, thereby providing a means to balance the current load across the three-phase system without using three separate single-phase transformers to accomplish the same objective.

The transformer has a three-phase primary winding with a design voltage appropriate for the application and three center-tapped, single-phase secondary windings, also with design voltages appropriate for the application, configured to operate at a 120 degree phase differential to each other. All three center taps are connected together electrically so as to provide a single reference potential, common to each of the six output terminals of the power transformer secondary.

The preferred embodiment of the power transformer of the present invention utilizes three bifilar-wound secondaries to more accurately balance the impedance properties of the transformer's secondary windings, thereby optimizing the performance of the transformer with respect to reducing or eliminating reactive currents, reducing or eliminating EMI/RFI emissions from non-linear loads, minimizing harmonic distortion, reducing or eliminating objectionable grounding currents, and maintaining a high power factor.

DETAILED DESCRIPTION OF THE PREFERRED EMBODIMENTS

Figure 1:
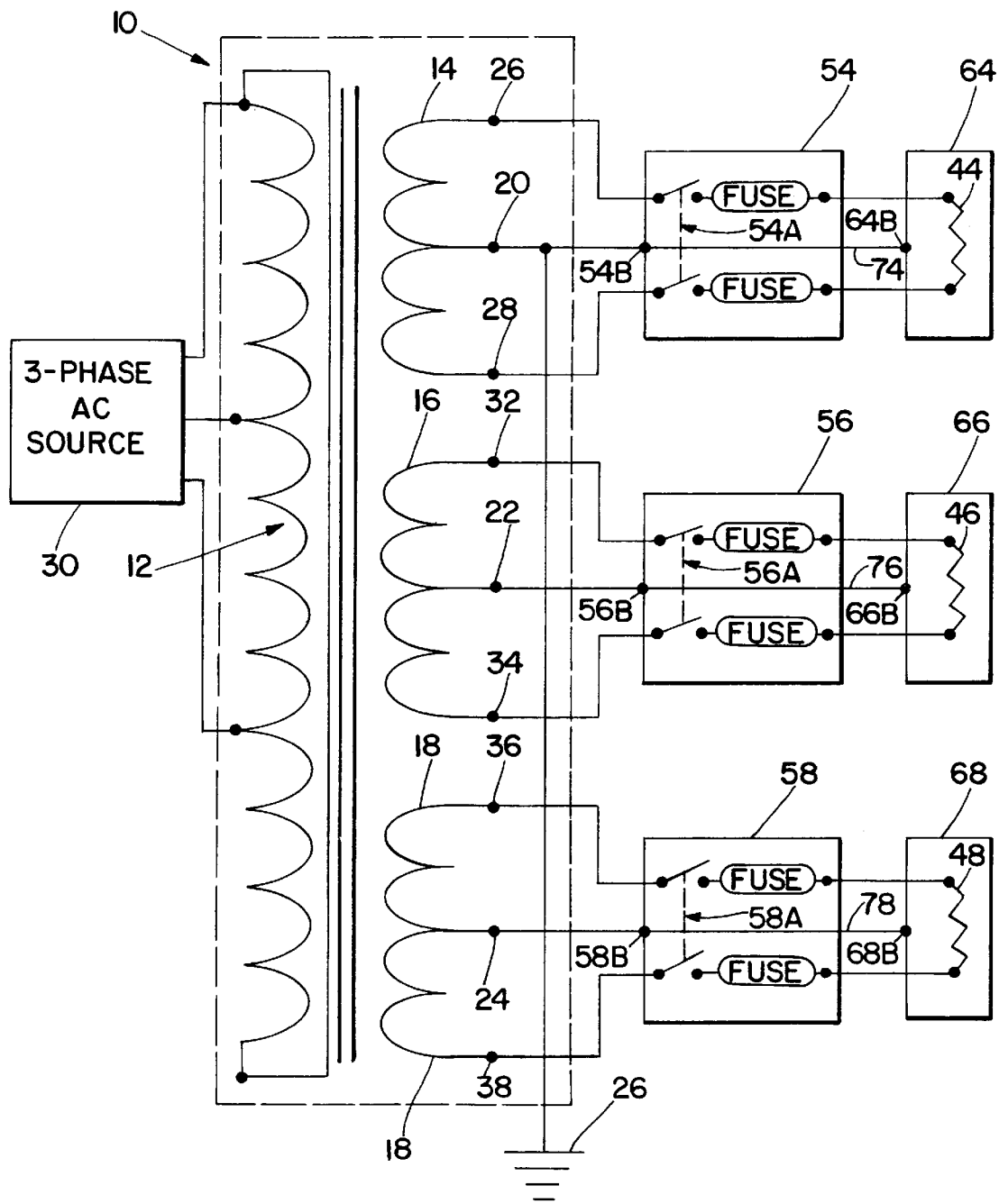
FIG. 1 is a schematic drawing of a three-phase power system utilizing a three-phase to six-phase "wye" power transformer with center-tapped secondary windings which is interposed between a three-phase power source and single-phase loads according to the present invention.

Referring first to FIG. 1, a transformer 10 has a three-phase primary winding 12 with a design voltage appropriate for the application and three single-phase secondary windings 14, 16, 18, also with design voltages appropriate for the loads to which the power output of the transformer 10 is to be applied. Each of the secondary windings 14, 16, 18 has a center tap 20, 22, 24, respectively. Each of the three secondary windings 14, 16, 18 is configured to operate at a 120 degree phase differential to each of the other two secondary windings. All three center taps 20, 22, 24 are electrically connected to a common reference point 28 so as to provide a single reference potential which is common to each of the center taps 20, 22, 24. The secondary winding 14 has a pair of output terminals 26, 28, across which a power output of a first phase is developed when three-phase ac power from an ac power source 30 is applied to the transformer primary winding 12. The secondary winding 16 has a pair of output terminals 32, 34, across which a power output, in response to the application of power to the primary winding 12, is developed which is of a second phase which has a 120 degree phase differential with respect to the phase of the electrical output developed across the secondary winding 14. The secondary winding 18 has a pair of output terminals 36, 38, across which a power output, in response to the application of power to the primary winding 12, is developed of a third phase which has a 120 degree phase differential with respect to the phases of the electrical outputs developed across the secondary windings 14 and 16.

Three impedance loads 44, 46 and 48 are electrically connected to the secondary windings 14, 16, 18, respectively, by means of conventional electrical circuitry. Preferably, each secondary winding 14, 16, 18 is isolated from its respective load 44, 46, 48 by an appropriate overcurrent device 54, 56, 58, respectively. In FIG. 1, the overcurrent devices are shown as two-pole fused switches for illustrative purposes only, and not by way of limitation. Any other appropriate overcurrent device, such as various types of circuit breakers or thermal cut-offs, can be utilized to provide the same safety features as are provided by the switches 54, 56, 58. For purposes of illustration only, each of the switches in the overcurrent devices is shown in its open position. It is to be understood that these switches are normally in their closed positions when it is desired that electrical power be applied to their respective loads 44, 46, 48.

The impedance loads 44, 46, 48 are electrically isolated from the common point 26, such as by housings 64, 66, 68, respectively, to which the common point 26 is electrically connected so as to provide the common reference potential for the loads 44, 46, 48, while preventing the inadvertent short-circuiting of the electrical power output of the secondary windings 14, 16, 18 when applied to the loads 44, 46, 48 through the overcurrent devices 54, 56, 58. Preferably, the switches 54A, 56A, 58A of the overcurrent devices 54, 56, 58 are similarly electrically isolated from the common point 26, as is schematically illustrated in FIG. 1 by conventional electrical lead line and termination dot schematic drawing notation, such as the lead line 74, 76, 78, the overcurrent device termination dots 54B, 56B, 58B, and the load housing termination dots 64B, 66B, 68B illustrated in FIG. 1 with respect to the secondary windings 14, 16, 18, overcurrent devices 54, 56, 58, and load housings 64, 66, 68.

Interposing the transformer 10 in a three-phase system schematically illustrated in FIG. 1 to provide for the application of single-phase power to each of the loads 44, 46, 48 which is unique to each of their respective transformer secondary windings 14, 16, 18, provides for the following advantages over the use of prior art power transformers for three-phase power applications:

1. reduces, if not eliminating, the reactive currents which exist in the loads to which conventional transformer secondary outputs are applied;
2. reduces EMI/RFI emissions from non-linear loads to which the transformer secondaries are connected,
3. reduces harmonic distortion in the power circuitry,
4. reduces nuisance grounding currents in the grounding circuits connected to the secondary loads; and
5. maintains a higher power factor in the three-phase ac power source and provides a lower voltage to ground ratio in the secondary load circuits than do conventional power transformers, thereby decreasing the danger of electrical shock to personnel using electrical equipment, while increasing the reliability of the equipment by reducing the likelihood of electrical shorts in the secondary loads to which the single-phase power outputs are applied.

Figure 2:
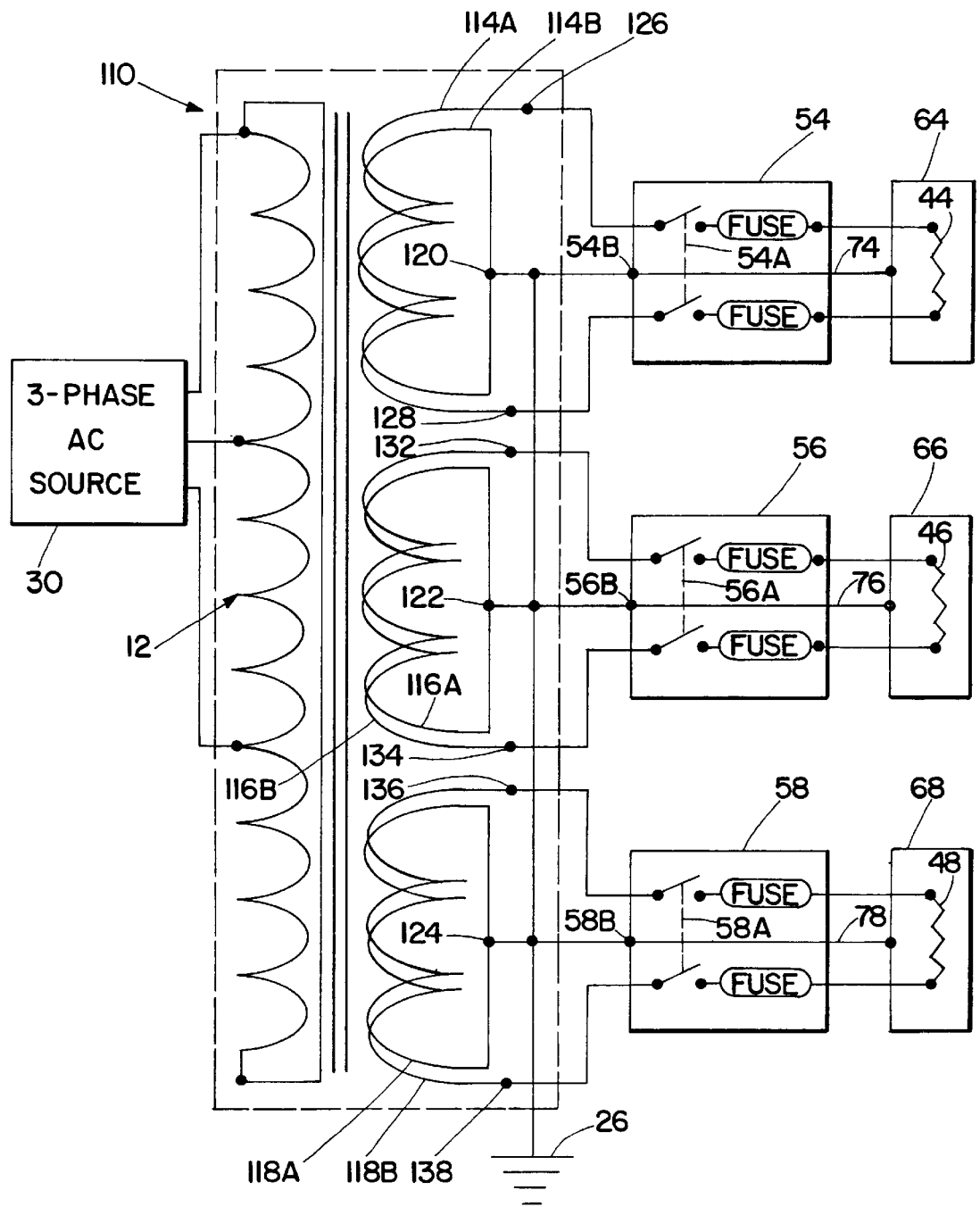
FIG. 2 is a schematic drawing of a three-phase power system utilizing a three-phase to six-phase "wye" power transformer to six-phase "wye" power power transformer with center-tapped bifilar-wound secondary windings, which is interposed between a three-phase power source and single-phase loads according to the present invention.

The preferred embodiment of the invention is illustrated in FIG. 2. In FIG. 2, a transformer 110 according to the invention utilizes three bifilar-wound secondary windings 114, 116, 118 to balance the output impedances of the three secondary windings 114, 116, 118 more accurately than has been accomplished in the prior art or may be expected to be accomplished in the embodiment illustrated in FIG. 1, thereby providing for optimal performance of a three-phase to six-phase "wye" transformer power supply system according to the present invention. The transformer 110 has a three-phase primary winding 12 with a design voltage appropriate for the application. The three bifilar-wound single-phase secondary windings 114, 116, 118, also with design voltages appropriate for the loads to which the power output of the transformer 110 is to be applied. Each of the secondary windings 114, 116, 118 has a center tap 120, 122, 124, respectively. Each of the three secondary windings 114, 116, 118 are configured to operate at a 120 degree phase differential to each of the other two secondary windings. All three center taps 120, 122, 124 are electrically connected to a common reference point 28 so as to provide a single reference potential which is common for each of the center taps 120, 122, 124. The secondary winding 114 has a pair of output terminals 126, 128, across which a power output of a first phase is developed when three-phase ac power from an ac power source 30 is applied to the transformer primary winding 112. The secondary winding 116 has a pair of output terminals 132, 134, across which a power output is developed of a second phase, which has a 120 degree phase differential with respect to the phase of the electrical output developed across the secondary winding 114. The secondary winding 118 has a pair of output terminals 136, 138, across which a power output is developed of a third phase, which has a 120 degree phase differential with respect to the phases of the electrical outputs developed across the secondary windings 114 and 116.

Three impedance loads 44, 46 and 48 are electrically connected to the secondary windings 114, 116, 118, respectively, by means of conventional electrical circuitry. Preferably, each secondary winding 114, 116, 118 is isolated from its respective load 44, 46, 48 by a conventional overcurrent device 54, 56, 58, such as the two-pole fused switches shown by way of illustration in FIG. 2.

The impedance loads 44, 46, 48 are electrically isolated from the common point 26, such as by housings 64, 66, 68, respectively, to which the common point 26 is electrically connected so as to provide the common reference potential for the loads 44, 46, 48, while preventing the inadvertent short-circuiting of the electrical power output of the secondary windings 114, 116, 118 when applied to the loads 44, 46, 48 through the overcurrent devices 54, 56, 58. Preferably, the switches 54A, 56A, 58A of the overcurrent devices 54, 56, 58 are similarly electrically isolated from the common point 26, as is schematically illustrated in FIG. 2 by conventional electrical lead line and termination dot schematic drawing notation, such as the lead lines 74, 76, 78, the overcurrent device termination dots 54B, 56B, 58B, and the load housing termination dots 64B, 66B, 68B illustrated in FIG. 2 with respect to the secondary windings 14, 16, 18, overcurrent devices 54, 56, 58, and load housings 64, 66, 68.

Interposing the bifilar secondary windings 114, 116, 118 of the transformer 110 in the three-phase system schematically illustrated in FIG. 2 more accurately balances the impedance properties of the three-phase to six-phase "wye" transformer of the present invention than do the secondary windings 14, 16, 18 of the transformer 10, so as to provide for the optimization of the advantages enumerated above achieved by the use of the transformer of the present invention in a three-phase to six-phase "wye" power system over the use of conventional transformers used in three-phase power distribution applications.

The invention claimed is:

1. A method for reducing the reactive currents otherwise existing in a single-phase impedance load connected to a three-phase power supply system in which electrical power from a three-phase ac power source is applied to the single-phase impedance load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

2. The method of claim 1, and in which the power transformer secondary winding supplying the transformed power to the load is a bifilar winding.

3. A method for reducing the EMI/RFI emissions from a single-phase impedance load connected to a three-phase power supply system in which electrical power from a three-phase ac power source is applied to the single-phase impedance load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

4. The method of claim 2, and in which the power transformer secondary winding supplying the transformed power to the load is a bifilar winding.

5. A method for reducing harmonic distortion resulting when electrical power from a three-phase ac power source is applied to a single-phase impedance load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

6. The method of claim 5, and in which the power transformer secondary winding supplying the transformed power to the load is a bifilar winding.

7. A method for reducing nuisance grounding currents occurring in grounding circuits of a three-phase power supply system in which electrical power from a three-phase ac power source is applied to a single-phase impedance load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

8. The method of claim 7, and in which the power transformer secondary winding supplying the transformed power to the load is a bifilar winding.

9. A method for improving the power factor in a three-phase power supply system in which electrical power from a three-phase ac power source is applied to a single-phase impedance load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

10. The method of claim 9, and in which the power transformer secondary winding supplying the transformed power to the load is a bifilar winding.

11. A method for providing a lower voltage to ground ratio in a single-phase impedance load circuit connected to a three-phase power supply system in which electrical power from a three-phase ac power source is applied to the single-phase impedance load, thereby decreasing the danger of electrical shock to personnel using electrical equipment which includes the load, while increasing the reliability of the equipment by reducing the likelihood of electrical shorts in the load, comprising:

interposing an isolation power transformer having a three-phase primary winding and a six-phase "wye" connected secondary winding, at least one of which secondary windings has a center tap which provides a reference potential for the transformed power to be applied to the load, between the ac power source and the load, and connecting said one of said secondary windings to the load with said center tap providing the reference potential for the transformed power applied to the load so that reactive load currents and other power artifacts existing across the load are equal and inversely-phased with respect to said reference potential when the power from the three-phase ac power source is applied to the primary winding of the three-phase to six-phase power transformer.

12. The method of claim 11, and in which the power transformer secondary winding supplying the transformed power to the load is a bifilar winding.

13. The method of claim 1, wherein each of the three phase windings in said secondary of said transformer has a center tap and is connected to the load such that said center tap provides a reference potential for the load and the reactive load currents are equal and inversely-phased with respect to said reference potential.

14. The method of claim 3, wherein each of the three phase windings in said secondary of said transformer has a center tap and is connected to the load such that said center tap provides a reference potential for the load and the reactive load currents are equal and inversely-phased with respect to said reference potential.

15. The method of claim 5, wherein each of the three phase windings in said secondary of said transformer has a center tap and is connected to the load such that said center tap provides a reference potential for the load and the reactive load currents are equal and inversely-phased with respect to said reference potential.

16. The method of claim 7, wherein each of the three phase windings in said secondary of said transformer has a center tap and is connected to the load such that said center tap provides a reference potential for the load and the reactive load currents are equal and inversely-phased with respect to said reference potential.

17. The method of claim 9, wherein each of the three phase windings in said secondary of said transformer has a center tap and is connected to the load such that said center tap provides a reference potential for the load and the reactive load currents are equal and inversely-phased with respect to said reference potential.

18. The method of claim 11, wherein each of the three phase windings in said secondary of said transformer has a center tap and is connected to the load such that said center tap provides a reference potential for the load and the reactive load currents are equal and inversely-phased with respect to said reference potential.

* * * * *